Patented July 14, 1936

2,047,669

UNITED STATES PATENT OFFICE 2,047,669

CITRIC ACID MANUFACTURE

Frank J. Cahn, Chicago, Ill.

No Drawing. Application February 5, 1935, Serial No. 5,094

14 Claims. (Cl. 195—36)

The present invention relates to improvements in the manufacture of citric acid by fermentation.

It has hitherto been proposed to produce citric acid by the action of selected aerobic fungi upon prepared culture media containing water soluble carbohydrates in the form of solutions or of gels containing gelatine or agar-agar. The fungi employed are ordinarily of the genera Aspergillus, Penicillium, Citromycetes, selected strains being employed which are found to produce citric acid in maximum proportions by action upon the carbohydrates. The propagation of the fungi for the production of spores or fungus tissue to be employed in inoculating the material fermented in accordance with the present invention and the selection of strains for the production of the desired acid being well known in the art, they will not be described further in the present specification.

It has been found that substantially increased yields of citric acid based upon glucose yielding carbohydrates such as starch present are produced by causing the selected strains of fungi to ferment starch containing seeds of plants belonging to the family of gramineae or upon slices of the potato tuber. The seeds of gramineae are the seeds of corn or wheat, barley, rye or millet or rice or similar plants which are cultivated as producers of starch. The seeds are fully or preferably partly dehulled. They might be broken. The so called bran might be used too, that is, the hull of the grain which in the milling of the grain was separated from the larger portion of the starch of the grain-seed but which still contains some starch left behind. With the bran this residual starch forms the carbohydrate for the subsequent citric acid fermentation. The material to be fermented is solid and consists of comparatively small particles or slices which have a high ratio of surface to volume. They are fermented aerobically by letting the fungus grow on the surface of the particles which are placed in such a way that interstices between the particles are formed which are in contact with the oxygen containing air of a suitable pressure. The fermentation is caused to take place in chambers into which beds of rice or similar seeds or sections of the other vegetable material containing glucose yielding substances are placed and which are inoculated with spores or tissues of the selected strain of fungus. It is preferred that these chambers be closed so that the supply of air or oxygen thereto may be controlled. The particles or slices may be coarse or fine as desired. For example with potato tubers ⅛ to ½ inch slices are suitable. The slices or seed particles may, of course, be widely varied in size. The material to be fermented is placed on trays the bottom of which consists of an acid resisting wire screen. The chambers may be jacketed for external heating or cooling and through the jacket hot or cold water might be passed in order to control the temperature in the chamber.

By employing the carbohydrate-containing vegetable slices or sections in place of the liquid or gelled culture media hitherto employed, I have found that a substantially increased proportion of the starch present is converted at a rapid rate into the desired acid; for example, the amount of citric acid produced by selected strains of Aspergillus is in excess of 50% of the amount of starch present when potato slices are employed, whereas with the culture media hitherto used, employing the same strain of fungus it has been difficult to secure proportions as high as 25 to 30%.

In general, it is preferred to effect at least a superficial sterilization of the carbohydrate-containing vegetable sections before inoculating them with the selected fungus. This may suitably be effected by subjecting them to heat for a brief period of time, for example, to the action of steam or hot gases while in transit on an open conveyor through a chamber into which the heating medium is supplied or in the chamber in which the fermentation is to take place.

The grain seeds should have their natural water content increased to about 85% by placing them in hot water whereby the starch gelatinizes. The water might contain nutrient salts which improve the fermentation by the fungus which is grown on the seeds afterwards.

It is readily apparent that the fermentative action may take place continuously, for example in an inclined rotary drum, preferably slowly rotated, fed with fresh grain or tuber slices and inoculating material at the upper end and discharging at the lower end.

The period required for the fermentation varies with conditions of operation, the specific fungus employed, the temperature of operation and the proportion of oxygen available. Thus, with a selected *Aspergillus niger*, I have secured over 50% conversion of starch present in potato tuber slices originally ⅛ inch thick in 2 days in air and at approximately 25° C. With increased temperature or increased oxygen concentration, a shorter time is required. It is evident that with the specific fungus and a particular vegetable section the optimum period may readily be determined by experiment, for example, by ascertaining at intervals the percentage yield of the desired acid under the condition determined upon, charting the results and noting the period after which the increase in yield for each successive period becomes uneconomical.

The material may likewise be inoculated with spores or tissues derived from a preceding completed fermentation. In such case, however, at frequent intervals the cultures must be tested for their activity in the production of the citric acid from starch, as frequently, the continued repropagation of a fungus in this manner will result in a change in the character of the acid produced by its fermentation.

After the fermentation, the fermented vegetable material is pressed or leached out to remove the acid produced during the fermentation, which is, if desired, purified in the usual manner; for example, by neutralization with lime, preferably hydrated lime, to form calcium citrate, precipitation of the citrate and decomposition by sulfuric acid to form the purified acid.

I claim:

1. The method of producing citric acid by the action of fungi which comprises providing sections of starch-containing plants in solid form, disposing said sections upon a support with interstices therebetween, inoculating said sections with a selected citric acid-producing fungus strain, and growing said fungus thereon in the presence of an oxygen-containing gas to convert the starch to citric acid.

2. The method of producing citric acid by the action of fungi which comprises providing discrete particles or sections of starch-containing plants in solid form, arranging said particles or sections upon a support to provide interstices therebetween whereby an oxygen-containing gas may have ready access thereto, inoculating said particles or sections with a selected citric acid-producing fungus strain, and growing said fungus thereon in the presence of an oxygen-containing gas to convert the starch to citric acid.

3. The method of claim 1 wherein the oxygen-containing gas is air.

4. The method of claim 2 wherein the oxygen-containing gas is air.

5. The method of claim 1 wherein the starch-containing plants are the seeds of gramineae.

6. The method of claim 1 wherein the selected citric acid-producing fungus strain is *Aspergillus niger*.

7. The method of claim 1 wherein the starch-containing plants are the seeds of gramineae and the selected citric acid-producing fungus strain is *Aspergillus niger*.

8. The method of claim 1 wherein the starch-containing plants are the seeds of gramineae, and including the step of swelling said seeds in water prior to the inoculation thereof with the citric acid producing fungus.

9. The method of claim 1 wherein the starch-containing plants are the seeds of gramineae, and including the step of swelling said seeds by subjection thereof to steam prior to the inoculation thereof with the citric acid producing fungus.

10. The method of claim 1 wherein the starch-containing plants constitute the bran of seeds of gramineae.

11. The method of claim 1 wherein the starch-containing plants constitute the bran of seeds of gramineae, and including the step of swelling said seeds in water prior to the inoculation thereof with the citric acid producing fungus.

12. The method of claim 1 wherein the starch-containing plants constitute the bran of seeds of gramineae, and including the step of swelling said seeds by subjection thereof to steam prior to the inoculation thereof with the citric acid producing fungus.

13. The method of claim 1 wherein the starch-containing plants are potato tuber slices.

14. The method of claim 1 wherein the starch-containing plants are potato tuber slices and the selected citric acid producing fungus strain is *Aspergillus niger*.

FRANK J. CAHN.